(12) United States Patent
Murray et al.

(10) Patent No.: US 7,635,299 B2
(45) Date of Patent: Dec. 22, 2009

(54) WINDROW FORMING CONSTRUCTION

(75) Inventors: Craig E. Murray, Rock Island, IL (US); Koen Landuyt, Maldegem (BE)

(73) Assignee: CNH America LLC, New Holland, PA (US)

(*) Notice: Subject to any disclaimer, the term of this patent is extended or adjusted under 35 U.S.C. 154(b) by 108 days.

(21) Appl. No.: 11/904,980

(22) Filed: Sep. 28, 2007

(65) Prior Publication Data
US 2009/0088231 A1    Apr. 2, 2009

(51) Int. Cl.
*A01F 12/30* (2006.01)
(52) U.S. Cl. ........................................ 460/111
(58) Field of Classification Search .......... 460/111, 460/112, 901; 56/192, 504; 239/650, 681
See application file for complete search history.

(56) References Cited

U.S. PATENT DOCUMENTS

| | | | |
|---|---|---|---|
| 2,854,046 A | 9/1958 | Devorak | 146/117 |
| 2,911,780 A | 11/1959 | Brady | 56/1 |
| 2,918,776 A | 12/1959 | Coultas | 56/192 |
| 3,221,484 A | 12/1965 | van der Lely | 56/370 |
| 3,803,821 A | 4/1974 | Peacock et al. | 56/192 |
| 3,815,823 A * | 6/1974 | Johnson | 239/650 |
| 3,841,070 A | 10/1974 | Scarnato et al. | 56/14.4 |
| 4,532,941 A | 8/1985 | Gauthier | 130/27 R |
| 4,991,383 A | 2/1991 | Ermarcora | 56/14.9 |
| 5,930,988 A | 8/1999 | Hanson | 56/16.4 A |
| 6,238,286 B1 | 5/2001 | Aubry et al. | 460/111 |
| 6,251,009 B1 * | 6/2001 | Grywacheski et al. | 460/112 |
| 6,331,142 B1 * | 12/2001 | Bischoff | 460/112 |
| 6,547,169 B1 * | 4/2003 | Matousek et al. | 239/661 |
| 6,616,528 B2 | 9/2003 | Wolters et al. | 460/111 |
| 6,854,251 B2 * | 2/2005 | Snider | 56/192 |
| 7,220,179 B2 * | 5/2007 | Redekop et al. | 460/112 |
| 7,261,633 B2 * | 8/2007 | Benes | 460/111 |
| 7,331,855 B2 * | 2/2008 | Johnson et al. | 460/112 |
| 2005/0282602 A1 * | 12/2005 | Redekop et al. | 460/112 |
| 2006/0073860 A1 * | 4/2006 | Redekop et al. | 460/112 |
| 2006/0123764 A1 | 6/2006 | McLean et al. | 53/350 |

FOREIGN PATENT DOCUMENTS

DE            3740607         6/1989

* cited by examiner

*Primary Examiner*—Árpád Fábián-Kovács
(74) *Attorney, Agent, or Firm*—Michael G. Harms; John William Stader; Patrick M. Sheldrake

(57) ABSTRACT

A windrow forming construction mountable at the rear of a combine above the level of a spreader assembly, such construction extending rearwardly from the combine to beyond the rear extent of the spreader assembly footprint and laterally across the expanse of the spreader assembly footprint and being adjustably positionable to vary the inclination thereof relative to the ground surface, the construction including side deflectors disposed at opposite sides of the construction so as to control to some extent the sidewardly distribution of the crop residue, which side deflectors are laterally pivotable about generally vertical axes to vary the spacing between the free ends thereof and are also longitudinally extendable so as to channel to some extent the crop residue towards the space between the free ends, and a positioning mechanism operable to vary the inclination of such construction relative to the ground surface so as to control to some extent the degree with which the crop residue is directed into the stubble remaining on the field and to support the construction in such position.

23 Claims, 10 Drawing Sheets

WINDROW FORMING CONSTRUCTION

TECHNICAL FIELD

The present invention relates generally to a construction for controlling and channeling the discharge of crop residue from an agricultural combine, and more particularly to the provision of a windrow forming construction for use in forming windrows of crop residue behind the combine as a crop is harvested.

BACKGROUND ART

Axially arranged rotary threshing or separating systems have long been in use in agricultural combines for threshing crops to separate grain from crop residue, also referred to as material other than grain (MOG). Such axially arranged systems typically include at least one cylindrical rotor rotated within a concave or cage, the rotor and surrounding concave being oriented so as to extend forwardly to rearwardly within the combine.

In operation, crop material is fed or directed into a circumferential passage between the rotor and the concave, hereinafter referred to as a rotor residue passage, and is carried rearwardly along a generally helical path in such passage by the rotation of the rotor as grain is threshed from the crop material. The flow of crop residue or MOG remaining between the rotor and concave after threshing is typically discharged or expelled by the rotating rotor at a rear or downstream end of the rotor and the rotor residue passage in a generally downward, or a downward and sidewardly, direction in what is a continuation of the helical path of movement of the crop residue within the rotor residue passage between the rotor and concave.

The flow is typically discharged into a discharge opening at the downstream end of the rotor and into a further passage, hereinafter referred to as a discharge passage, that extends downwardly and somewhat rearwardly into a crop residue distribution system located below and rearwardly of the rear end of the threshing system. The crop residue distribution system typically includes a rotary beater or chopper or other apparatus that beats or chops the residue into smaller pieces and propels that finer crop residue rearwardly towards an area within the rear end of a combine, hereinafter referred to as a distribution chamber. The crop residue provided to the distribution chamber may be discharged therefrom onto a field either as a windrow or by spreading the crop residue across a crop swath cut.

In some instances and with some combines, the crop residue may simply be discharged from an exit port over the top of a spreader assembly at the rear of the combine to bypass the spreader assembly and to fall upon the ground behind the spreader assembly when windrowing is desired. In other instances and/or with other combines, however, regardless of whether windrowing or swath spreading is desired, the crop residue is discharged from a rear residue output port towards a spreader assembly, or at least the position in which a spreader assembly would be located, for windrowing or swath spreading, depending upon the setup of the spreader assembly employed.

Typical spreader assemblies employed include pairs of counter-rotating spreader head assemblies mounted side-by-side to each other generally below and to the rear of a rear crop residue output port, sometimes with rubber or like curtains or shields installed extending at least part way along the sides from the front of the spreader assembly. Such spreader head assemblies include spreader plates, the rotation of which helps propel and direct crop residue falling onto the spreader plates for distribution. Such spreader plates are typically generally flat disks which often are configured to have spaced spreader bats on one side, generally considered the topside of the spreader plate. The bottom sides of such spreader plates typically are relatively flat. When swath spreading is desired, such spreader plates are generally mounted with the topside including the spreader bats facing upwardly so that the spreader bats can assist in throwing the crop residue somewhat sidewardly. On the other hand, when windrowing is desired, the spreader plates are generally mounted with the topside including the spreader bats facing downwardly and with the relatively flat bottom sides facing upwardly. In such configuration, the crop residue falls onto the relatively flat upwardly facing bottom sides of the spreader plates and is propelled rearwardly by the counter-rotation of such spreader plates.

In accordance with some setups, when windrowing is desired a user may even elect to totally remove or forego use of the spreader plates of a spreader assembly, or even to forego the use of a spreader assembly, and to simply discharge the crop residue from the rear residue output port directly onto the field.

With many of the various windrowing techniques employed and the constructions utilized to produce a windrow, the resulting windrow has been somewhat unevenly distributed behind the combine, instead of as a cohesive mat, and the crop residue forming the windrow has sometimes been blown or pressed downwardly into and against the stubble remaining on the field in a non-cohesive manner, resulting in a windrow formation that is less than ideal. Various difficulties, including the need for increased drying time and a lower positioning of the tines of a baler as the residue is being baled, and the problems resulting therefrom, are associated with such non-ideal windrow formations.

Users have therefore continued to seek new and improved techniques and constructions for better forming windrows, including as relatively uniform cohesive mats the elevations of which may be better or somewhat adjustably controllable relative to the remaining stubble on a field, that overcome or obviate or lessen various of the previous difficulties and concerns.

SUMMARY OF THE INVENTION

What is disclosed herein is thus a windrow forming construction that permits a user to adjust or controllably vary to some extent the lateral width of a windrow and the degree to which the crop residue is blown or thrown into the remaining stubble on the field, which windrow forming construction is installable at the rear of a combine to generally extend rearwardly over the top rear end of the footprint area of a spreader assembly positionable at the rear of the combine so that such windrow forming construction is usable both with combines utilizing the spreader plates of a spreader assembly as well as with combines that have foregone the use of such spreader plates and/or a spreader assembly.

Such windrow forming construction is mountable at the rear of the combine above the level of a spreader assembly to extend generally rearwardly from the combine, and includes a main body portion, a positioning and support mechanism, and side deflectors. The main body portion, when positioned for use, extends to beyond the rear extent of the spreader assembly footprint and laterally across the expanse of the spreader assembly footprint. The positioning and support mechanism, hereinafter referred to more simply as the positioning mechanism, is connected to the main body portion and is operable to vary the inclination of the main body portion relative to the ground surface, the effect of which may be to vary the degree with which the crop residue is directed into the stubble remaining on the field, and to support and maintain the main body portion in desired positions. The side deflectors are disposed at or near opposite sides of the construction to be adjustably movable to controllably vary to some extent the sidewardly distribution of the crop residue and the width of the resulting windrow.

In a preferred form, the main body portion of the windrow forming construction, sometimes hereinafter referred to more simply as the main body, includes an upper deck within an outer base frame preferably of a generally rectangular racetrack or ovaloid configuration, the front portion of which outer base frame is connectable at or to the rear of the combine, at a height defined as the frame mounting elevation, for at least partial rotational movement of the outer base frame about a generally horizontal axis of rotation at the frame mounting elevation, which axis of rotation is referred to hereinafter as the main body rotation axis. As the outer base frame is rotated about the main body rotation axis, the outer base frame, at a point in such rotation, is positionable to extend generally horizontally from the rear of the combine to a rear portion beyond the spreader assembly footprint, with the outermost side portions of the outer base frame extending beyond the sides of the spreader assembly footprint and with the upper deck within the outer base frame extending over the substantial entirety of the spreader assembly footprint to the rear of the combine.

A pair of side deflectors or baffles are pivotally mounted at or near the opposite front sides of the upper deck for rotation about respective axes generally transverse to the main body rotation axis, which transverse axes are hereinafter referred to as deflector rotation axes and which are generally vertical axes, though perhaps tilted more or less from the vertical, when the windrow forming construction is positioned in a use mode. Such side deflectors project downwardly from adjacent the upper deck towards the ground surface and extend generally rearwardly from their pivotally connected front or first ends to free second ends. Such deflectors are rotationally pivotable about their respective deflector axes, which are typically located near the outer ends of rubber or like side curtains along the front sides of the spreader assembly, to permit the deflectors to be pivotably movable to vary the spacing between the free second ends of such deflectors. Preferably, each deflector includes a first portion associated with the first pivotally connected end and a second portion associated with the free second end, with the first and second portions being longitudinally slidably or telescopically engaged with one another so as to permit the length of the deflector to be adjustably varied from a minimum retracted length to a maximum extended length. As the side deflectors are pivoted about their respective deflector axes, the spacing between the free second ends can be varied, the purpose of which will be better understood from the discussion that follows.

The positioning mechanism of such preferred form includes a pair of lift arms connected to the outer base frame and a pair of support arms that are engaged with the lift arms to provide support therefor. The lift arms have front portions connected to the front portion of the outer base frame and rear portions connected to the rear portions of the outer base frame. The support arms have front ends connectable to the rear of the combine at elevations higher than the frame mounting elevation and rear ends connectable to the rear portions of respective lift arms.

In one preferred configuration the front ends of the support arms may be connected to fixed positions on the combine or associated equipment and the rear ends of such support arms may be configured to engagably ride within slots that extend along the rear portions of the lift arms or to rest within associated spaced lock niches along the upper sides of the slots, which elements permit elevational adjustments and repositionings of the rear portion of the outer base frame. As the rear ends of the support arms are moved rearwardly along the slots, the elevation of the rear portion of the outer base frame increases, and as the rear ends of the support arms are moved forwardly along the slots, the elevation of the rear portion of the outer base frame decreases, with such actions effecting variations in the inclination of the main body relative to the ground surface. When the rear ends of the support arms are moved into corresponding lock niche pairs along the upper sides of the slots, the weight of the main body and the deflectors serves to lock the rear portion of the outer frame base at a given elevation and the main body at a given inclination.

The slots and lock niches are disposed along the rear ends of the lift arms such that, when the rear ends of the support arms are engaged with and in the most rearward lock niches, the outer frame base extends and is supported generally horizontal to the ground, and when the rear ends of the support arms are engaged with and in the most forward lock niches, the outer frame base extends almost fully downward, in a service position. By varying the lock niches with which the rear ends of the support arms are engaged, the inclination of the main body may thus be varied, with the various intermediate settings allowing the operator to control to some extent the inclination with which the crop mat is directed towards the ground and the stubble remaining thereupon.

In other configurations, the rear ends of the support arms may be connected to the lift arms at fixed points instead of riding along slots in the lift arms, and the front ends of such support arms may be adjustably variably engaged with slot and lock systems on the combine or associated equipment, which slot and lock systems may be similar in many respects to the slots and lock niches that have been discussed hereinabove, and/or the support arms may include telescopic or piston-like portions which could be adjustably varied by a user to alter the inclination of the main body relative to the ground surface.

Alternatively, the positioning mechanism could also include other types of lift assemblies connectable between the rear portion of the outer frame base and the combine or associated equipment, which lift assemblies may be operable to vary the height or elevation of the rear of such outer frame base, including by the use of hydraulic cylinders or electric motors or other acceptable mechanisms which can be operated to similar effect, which devices and mechanisms may further be remotely actuatable and controllable by the user from the cab of the combine.

In general, when swath spreading is desired, the windrow forming construction can be configured to permit the relatively unencumbered operation of the spreader assembly. This can be accomplished, at least in part, by setting or retracting the side deflectors to their retracted minimum lengths, by rotating the deflectors outwardly from one another about their respective deflector rotation axes to open the spacing between the free seconds ends of deflectors, and by maintaining the main body at or near a generally horizontal inclination relative to the ground surface. The spreader assembly can then operate in its standard manner to effect swath spreading of the crop residue.

When, instead, windrowing is desired, the windrow forming construction can be re-configured to generally establish a desired windrow width and the degree to which a user desires the crop residue to be directed into the stubble remaining on the field. This can be accomplished, at least in part, by extending the side deflectors to desired lengths to limit, to some extent, the sidewardly distribution of the crop residue, by rotating the deflectors inwardly towards one another about their respective deflector rotation axes to narrow the spacing between the free seconds ends of deflectors to a desired distance or width, and by rotating the main body about the main body rotation axis to a desired inclination relative to the ground surface. The spreader assembly can then operate in its windrow mode, with the spreader plates mounted with their associated spreader bats facing downwardly and with the flat sides of the spreader plates facing upwardly, to propel the crop residue rearwardly to be channeled and formed into a windrow by the windrow forming construction.

As will be further evident from the drawings herewith, which drawings representationally depict various of the more significant elements and features of preferred embodiments but which should not necessarily be considered to scale, and the accompanying description that follows, the present invention thus discloses a new and improved construction and technique for better forming windrows behind a combine, including windrows that may be deposited on the filed as relatively uniform cohesive mats the elevations of which may be better or somewhat adjustably controllable relative to the remaining stubble on the field, which construction and technique overcome or obviate or lessen various of the previous difficulties and concerns encountered with the formation of windrows.

DETAILED DESCRIPTION OF THE INVENTION

Figure 1:
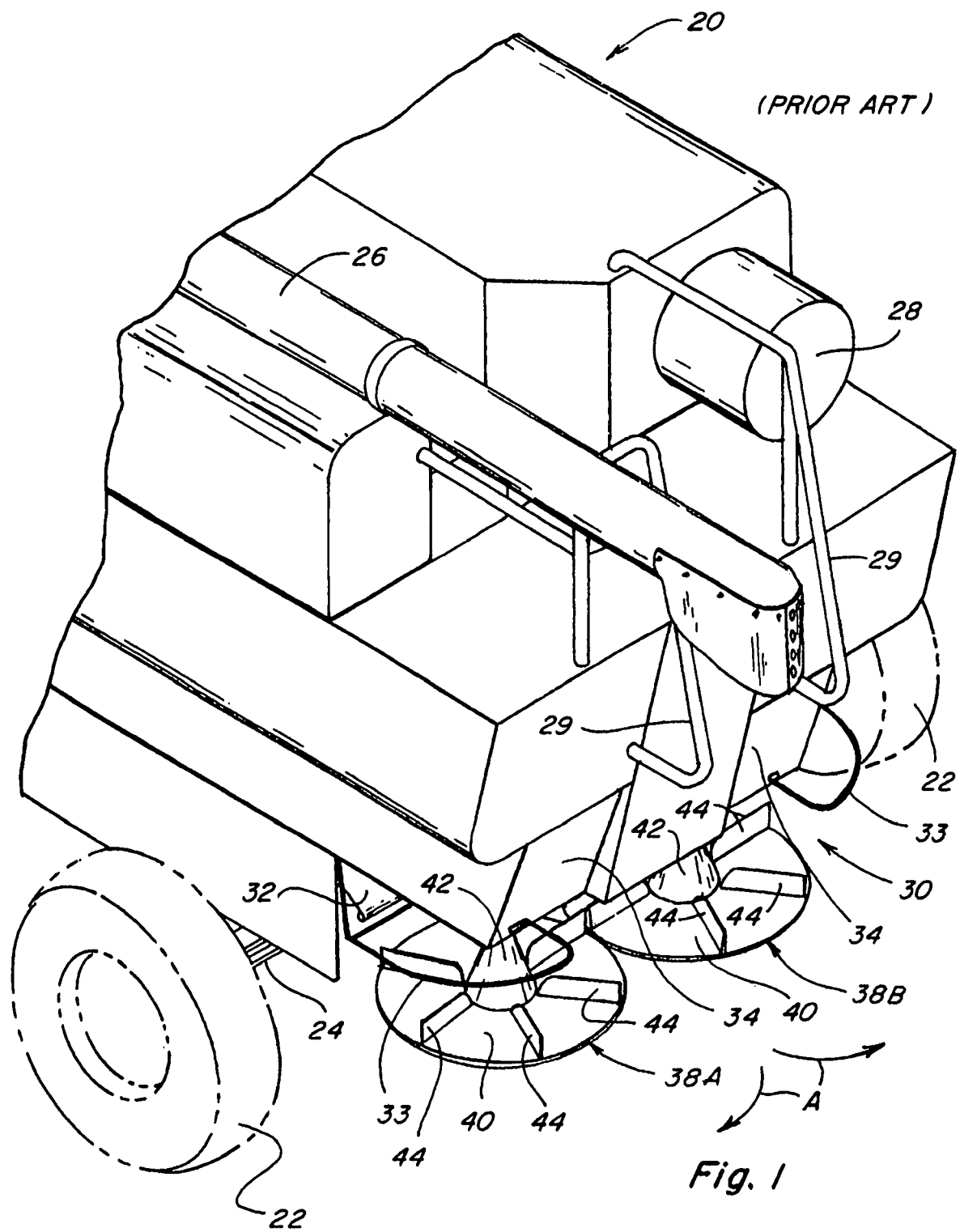
FIG. 1 is a partial perspective view of the rear end of a typical combine with an installed spreader assembly.

Referring now to the drawings, wherein like numerals refer to generally like or similar items and wherein certain numerals may be applied on a representational basis to selected, representative items of a class of like items instead of to all of the depicted like items, FIG. 1 depicts the rear portion of a typical combine 20 having a pair of rear tires 22 mounted upon a rear axle 24, with a grain auger or threshing rotor 26, an engine radiator air screen 28, and handrails 29 mounted upon the upper structure of the combine 20. A spreader assembly 30, of well known construction, is mounted generally below a crop residue discharge chute 32. For safety and other purposes, guard bars 33 are mounted extending generally over and across certain more exposed portions of the spreader assembly 30 and removable drive linkage cover plates 34 enclose associated drive linkages. When the threshing rotor 26 is operating, crop residue from such operation is discharged into discharge chute 32 which channels and directs the crop residue flow towards a pair of spreader head assemblies 38A and 38B of the spreader assembly 30, which spreader head assemblies 38A and 38B are mounted side-by-side to one another.

The spreader head assemblies 38A and 38B each include a spreader plate 40 and a spreader cone 42 to which the spreader plates 40 may be joined or secured. Except as may be addressed further hereinafter, the spreader plates 40 for the spreader head assemblies may be considered generally similar to one another, and are shown having spreader bats 44 mounted on one side thereof, hereinafter referred to as the topside of the spreader plate, with the opposite side generally being essentially flat.

When the spreader plates 40 are mounted with the their topsides up, as depicted in FIG. 1, the spreader assembly is generally considered to be configured for swath spreading. If the spreader plates are re-mounted such that their topsides face downwardly, the spreader assembly is generally considered to be configured for windrowing. As the combine moves through a field during a harvesting operation, crop residue is directed to the crop residue discharge chute 32 and to the spreader head assemblies 38A and 38B of spreader assembly 30 to be distributed by the counter-rotation of the spreader head assemblies 38A and 38B, which assemblies typically rotate in the directions indicated by arrows A.

In some instances, a user may elect to forego the use of any spreader plates when windrowing is desired. In such event, crop residue is directed to the crop residue discharge chute 32 and is discharged therefrom to fall to the ground.

FIGS. 2-5 are illustrative of the manner in which a windrow forming construction according to the present invention can be employed with a combine 20 and its spreader assembly 30 and can be configured when swath spreading, as opposed to windrowing, is desired. Rubber or like side curtains 46 are shown mounted along the sides of the spreader assembly 30, with the windrow forming construction 50 positioned and connected, as will be addressed in more detail hereinafter, to extend rearwardly from the combine 20 over the top of the spreader assembly 30, or the area that would be occupied by the spreader assembly 30 in the event that a user elects to forego the use of spreader plates 40 or a spreader assembly.

As will be appreciated from a further study of FIGS. 2-5, the main body 51 of windrow forming construction 50 is dimensioned to extend rearwardly from the combine 20 to beyond the footprint area of a spreader assembly 30 and laterally across the breadth of such a spreader assembly. The preferred embodiment depicted includes an upper deck 52 within an outer base frame 54 of a generally rectangular racetrack configuration, which outer base frame 54 is interrupted along its forward portion where the outer base frame is engaged with aligned brackets 56 at the rear of the combine 20 for journalled movement. The left and right forward portions 60A and 60B of the outer base frame 54 are further supported by journal box supports 62 spaced to the sides of the brackets 56 and positioned relative thereto to permit rotational movement of the thus engaged and supported outer base frame 54 about a lateral generally horizontal axis of rotation 64 at the rear of the combine 20, the height of such main body rotation axis 64 defining a frame mounting elevation. The rear portion 66 of outer base frame 54 extends beyond the spreader assembly footprint, and the outermost side portions 68A and 68B thereof extend beyond the sides of the spreader assembly footprint, with the upper deck 52 within the outer base frame 54 extending over the substantial entirety of the spreader assembly footprint to the rear of the combine 20.

Left and right side deflectors or baffles 70A and 70B are mounted at respective deflector pivot points 72A and 72B at or near the opposite front sides 74A and 74B of upper deck 52 to extend generally rearwardly therefrom from pivotally connected first ends 76A and 76B to respective free second ends 78A and 78B and to project downwardly from adjacent upper deck 52 towards the ground surface. Such deflectors 70A and 70B are pivotable about respective generally vertical deflector rotation axes 80A and 80B, typically located near the outer ends of rubber or like side curtains 46 along the front sides of the spreader assembly 30, to permit the deflectors 70A and 70B to be pivotably moved to vary the spacing between the free second ends 78A and 78B of such deflectors 70A and 70B.

The deflectors 70A and 70B include respective first portions 82A and 82B associated with the first pivotally connected ends 76A and 76B and respective second portions 84A and 84B associated with the free second ends 78A and 78B, with the first and second portion pairs 82A/84A and 82B/84B being longitudinally slidably or telescopically engaged with one another so as to permit the lengths of the deflectors 70A and 70B to be adjustably varied from a minimum retracted length to a maximum extended length.

Figure 2:
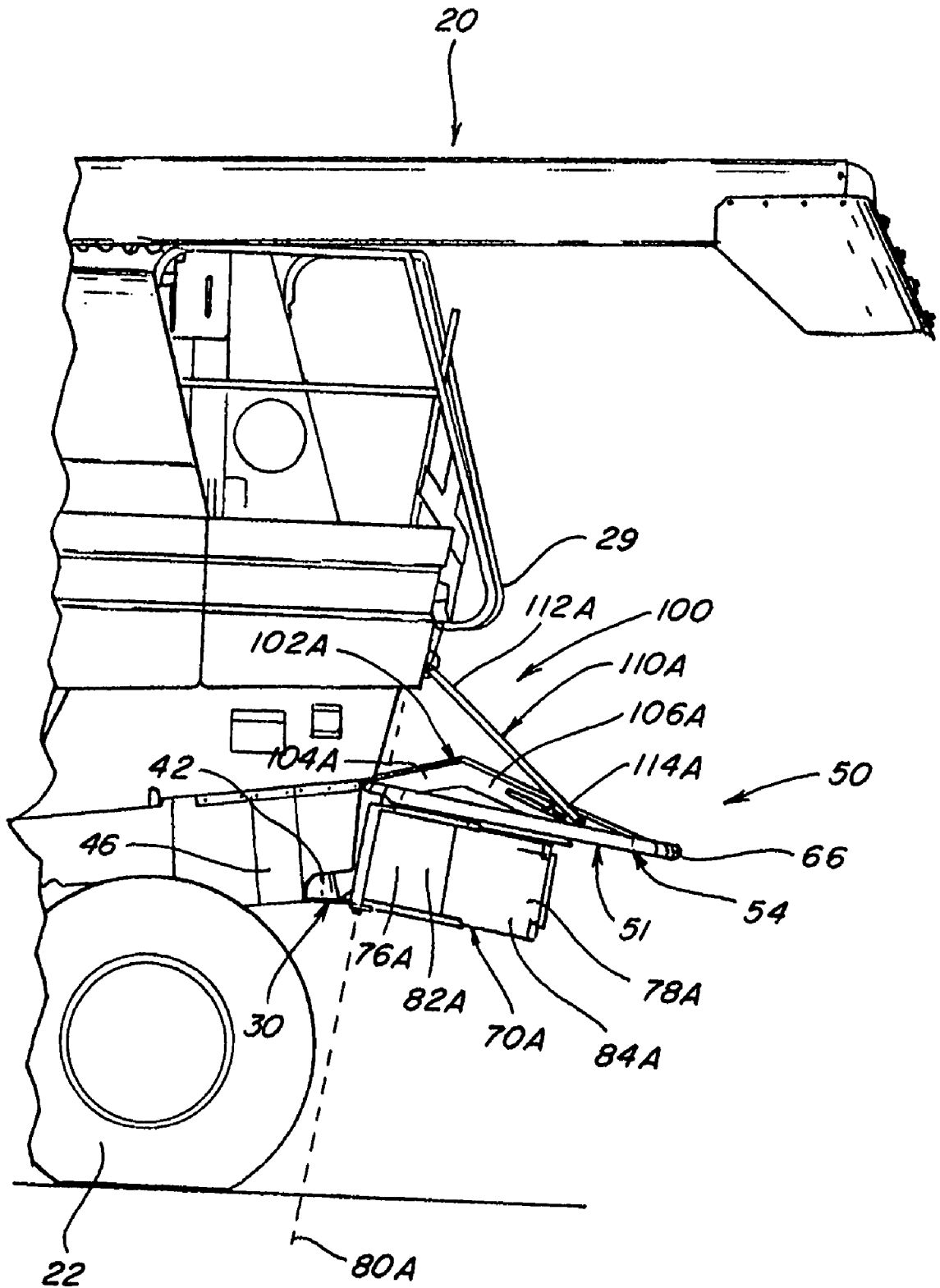
FIG. 2 is a left side view of the rear end of a typical combine with an installed spreader assembly that includes side curtains, showing a windrow forming construction according to the present invention mounted at the rear of the combine, with the left side deflector of the windrow forming construction shown partially extended.

In the embodiment of FIG. 2, upper deck 52 is shown as having a somewhat trapezoidal shape, with a wider front portion being disposed generally adjacent to the rear of the combine 20 and the forward portions 60A and 60B of outer base frame 54. Inwardly angled portions extend from the sides of the upper deck towards a narrower back portion generally adjacent the rear portion 66 of the outer base frame 54, with edge deflectors 95 being attached along the angled portions. Optionally, such edge deflectors 95 may be formed of a flexible or pliable material to accommodate pivotal movement of deflectors 70A and 70B past the positions of such edge deflectors 95, as will be further discussed hereinafter, and the upper deck may have a slight downward taper or angle near the rear portion 66 of outer base frame 54 to provide some downward deflection of crop residue at the rear of the windrow forming construction.

A positioning mechanism 100 includes a pair of lift arms 102A and 102B, having front portions 104A and 104B connected at or to the front portions 60A and 60B of the outer base frame 54, and rear portions 106A and 106B connected at or to the rear portion 66 of the outer base frame 54. A pair of support arms 110A and 110B, having front ends 112A and 112B connected to the rear of the combine 20 at elevations 113A and 113B higher than the frame mounting elevation, have rear ends 114A and 114B connected to the rear portions 106A and 106B of respective lift arms 102A and 102B to provide support therefor. In the preferred configuration depicted in FIG. 2 the support arms 110A and 110B are connected to one another by a interconnection portion 118 such that the support arms 110A and 110B and interconnection portion 118 define a U-shaped support.

Figure 3:
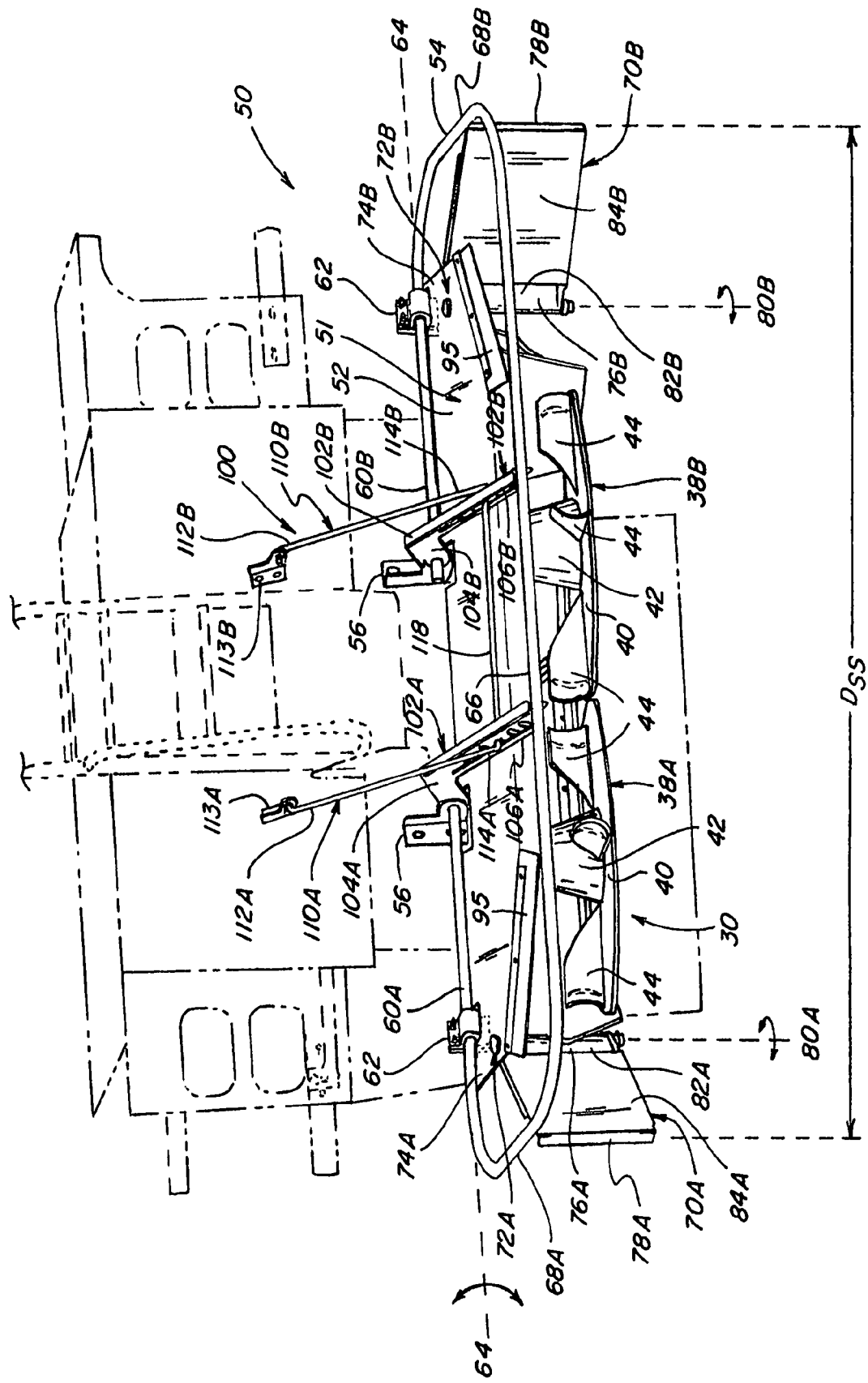
FIG. 3 is a rear, perspective view of an embodiment of a windrow forming construction according to the present invention in association with a spreader assembly, such view depicting the spreader plates of the spreader assembly and the windrow forming construction as they might be configured during a swath spreading operation, with the side deflectors of the windrow forming construction shown essentially retracted.
Figure 5:
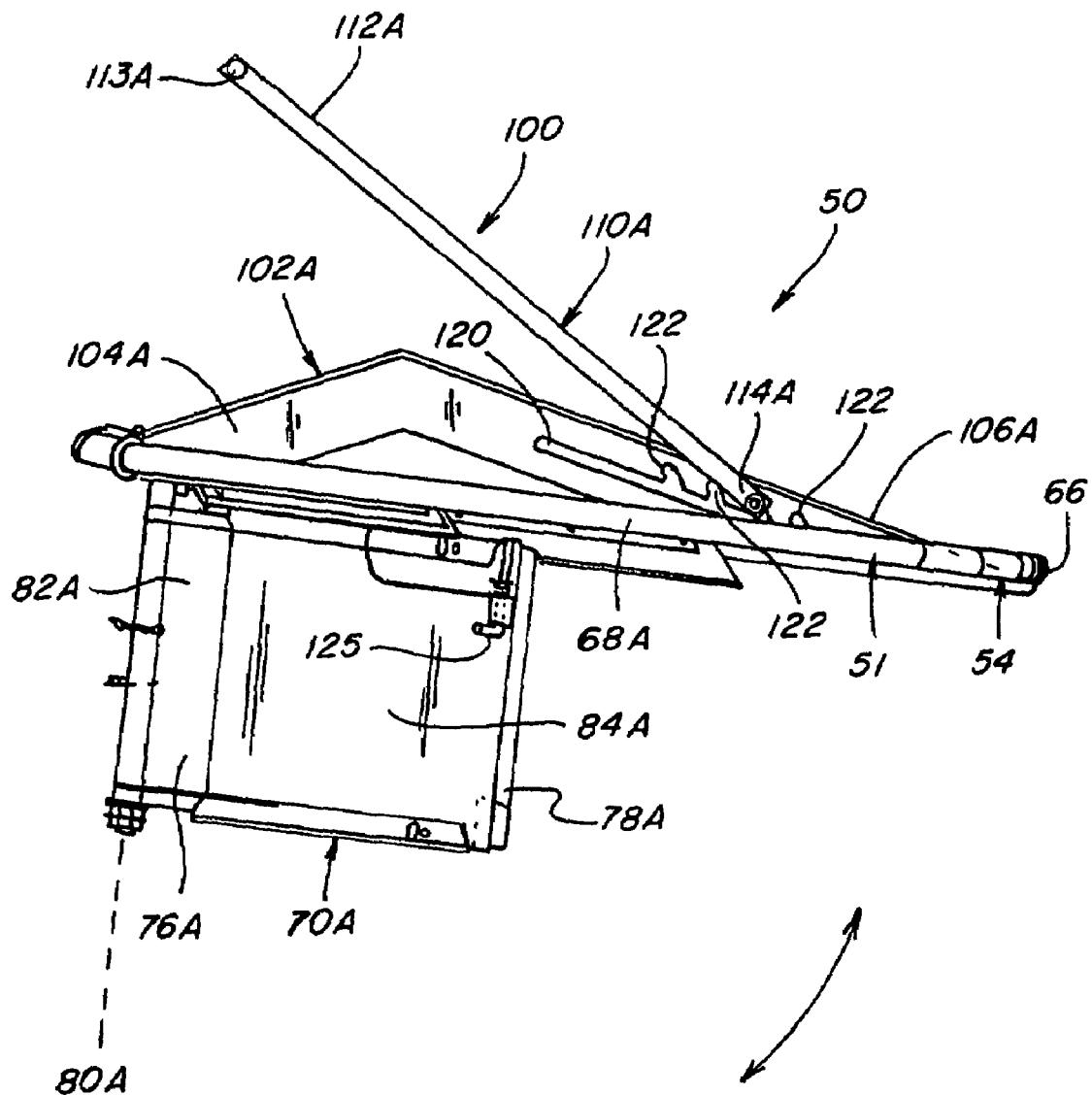
FIG. 5 is an enlarged left side view of the windrow forming construction of FIG. 4 better illustrating various of the elements and features of such construction.

As may be more readily observed from FIG. 5, when the front ends 112A, 112B of the support arms 110A and 110B of the preferred embodiment are connected to fixed positions F on the combine or associated equipment, the rear ends 114A, 114B of such support arms at interconnection portion 118 may be configured to engagably ride within slots 120 extending along the rear portions 106A and 106B of the lift arms 102A and 102B or to rest within corresponding pairs of a plurality of associated spaced lock niches 122 along the upper sides of the slots 120. Such engagement of the support arms 110A and 110B with the slots 120 along the rear portions 106A and 106B of the lift arms 102A and 102B permits elevational adjustment and repositioning of the rear portion 66 of the outer base frame 54 as the windrow forming construction 50 is rotated about the main body rotation axis 64 (FIG. 3). As the windrow forming construction 50 is rotated counterclockwise about the axis of rotation 64, rear ends 114A and 114B of the support arms 110A and 110B are moved rearwardly along the slots 120 and the elevation of the rear portion 66 of the outer base frame 54 is increased. As the windrow forming construction 50 is rotated clockwise about the axis of rotation 64, the rear ends 114A and 114B of the support arms 110A and 110B are moved forwardly along the slots 120 and the elevation of the rear portion 66 of the outer base frame 54 is decreased. When the rear ends 114A and 114B of the support arms 110A and 110B are moved into corresponding lock niches 122 along the upper sides of the slots 120, the weight of the outer frame base 54, the associated upper deck 52, and the side deflectors 70A and 70B serves to lock the rear portion 66 of the outer frame base 54 at a given height and the main body 51 at a given inclination relative to the ground surface.

The slots 120 and lock niches 122 are disposed along the rear ends 106A and 106B of the lift arms 102A and 102B such that, when the rear ends 114A and 114B of the support arms 110A and 110B are engaged with and in the most rearward lock niches, the outer frame base 54 extends and is supported generally horizontal to the ground, and when the rear ends 114A and 114B of the support arms 110A and 110B are engaged with and in the most forward lock niches, the outer frame base 54 extends almost fully downward, in a service position. By varying the lock niches with which the rear ends of the support arms are engaged, the inclination of the main body 51 may thus be varied, with the various intermediate settings allowing the operator to control to some extent the inclination with which the crop mat is directed towards the ground and the remaining stubble thereupon.

As the inclination of the main body 51 is thus varied, the deflector rotation axes 80A and 80B will be tilted to some extent, becoming more or less vertical, but remaining generally transverse to the main body rotation axis 64. When the rear ends 114A and 114B of the support arms 110A and 110B are moved to the most forward positions along the slots 120, the main body 51 is allowed to rotate about the main body rotation axis 64 to hang significantly vertically, in a service position, with the deflector rotation axes 80A and 80B then being disposed more horizontally than vertically. The degree to which rotation of the main body 51 about the main body rotation axis 64 is allowed will be dependent upon the sizes and dimensions of various elements and components of the combine 20 and spreader assembly 30, including the spreader plates 40, as well as the position of the frame mounting elevation at the rear of the combine 20 and the dimensions of the components of the windrow forming construction 50. Preferably, the degree of permitted rotation will be sufficient to allow easy servicing of elements but less than would result in impingement of the windrow forming construction 50 or its components with the spreader plates 40 or other elements of the spreader assembly 30.

With the side deflectors 70A and 70B retracted to minimum lengths and pivoted to the positions as depicted in FIG. 2, and the outer base frame 54 locked in a generally horizontal position, the free ends 78A and 78B of side deflectors 70A and 70B are spaced from one another by a distance $D_{SS}$ which permits relatively unimpeded distribution of the crop residue by spreader assembly 30. With such configuration, the spreader assembly 30 may be operated to effect swath spreading as the spreader plates 40 rotate and the spreader bats 44 on such spreader plates 40 propel the crop residue rearwardly and sidewardly in a swath on the field in a well known manner. Optionally, to ensure that the side deflectors remain configured as desired, stop and latching or locking mechanisms may be associated with the deflectors 70A and 70B along the sides 68A and 68B of the outer base frame 54 to maintain the deflectors 70A and 70B in a fixed spread position for swath spreading so as to not interfere with the operation of the spreader assembly 30. Such latching or locking mechanisms may be of any well known construction suitable for latching or locking the deflectors 70A and 70B in position, including constructions that employ latching or locking pins or bolts 125 with the deflectors 70A and 70B operable to be engaged by complementary elements associated with the sides 68A and 68B of the outer base frame 54.

When a user determines that, instead of spreading the crop residue in a swath on the field, he desires to discharge the crop residue as a windrow, he would be expected to either reverse the attitude of the spreader plates 40 such that the relatively flat sides face upwardly and the spreader bats 44 on the opposite sides of the spreader plates face downwardly or to remove the spreader plates entirely. In such event, the windrow forming construction of the present invention can be readily reconfigured, as depicted in FIGS. 6-8, to adjust or controllably vary to some extent the lateral width of the windrow and the degree to which the crop residue is blown or thrown into the remaining stubble on the field.

Figure 4:
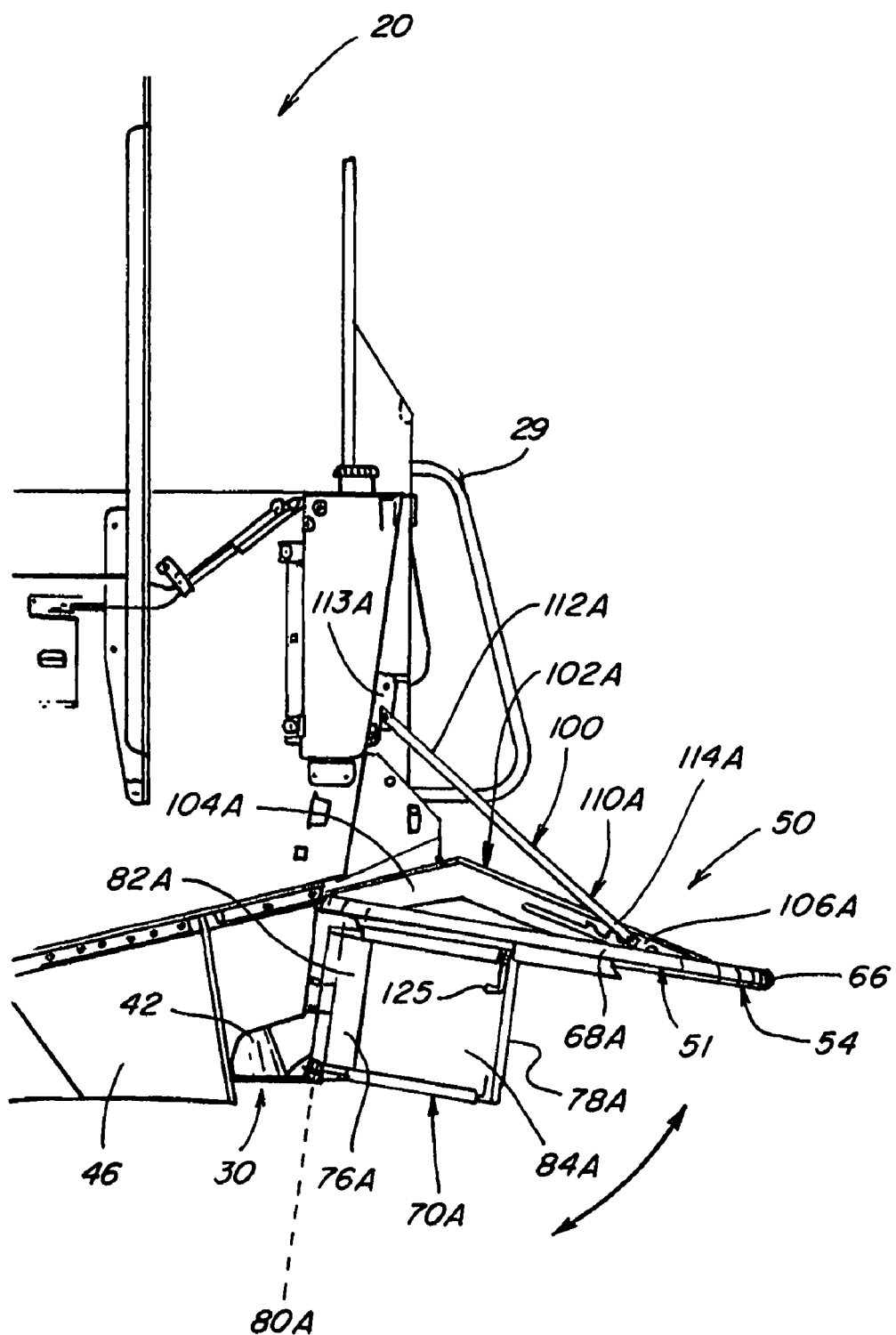
FIG. 4 is a left side view of a windrow forming construction similar to that depicted in FIG. 3, as installed at the rear of a combine and in association with a spreader assembly, with the side deflectors of the windrow forming construction in essentially retracted positions.
Figure 6:
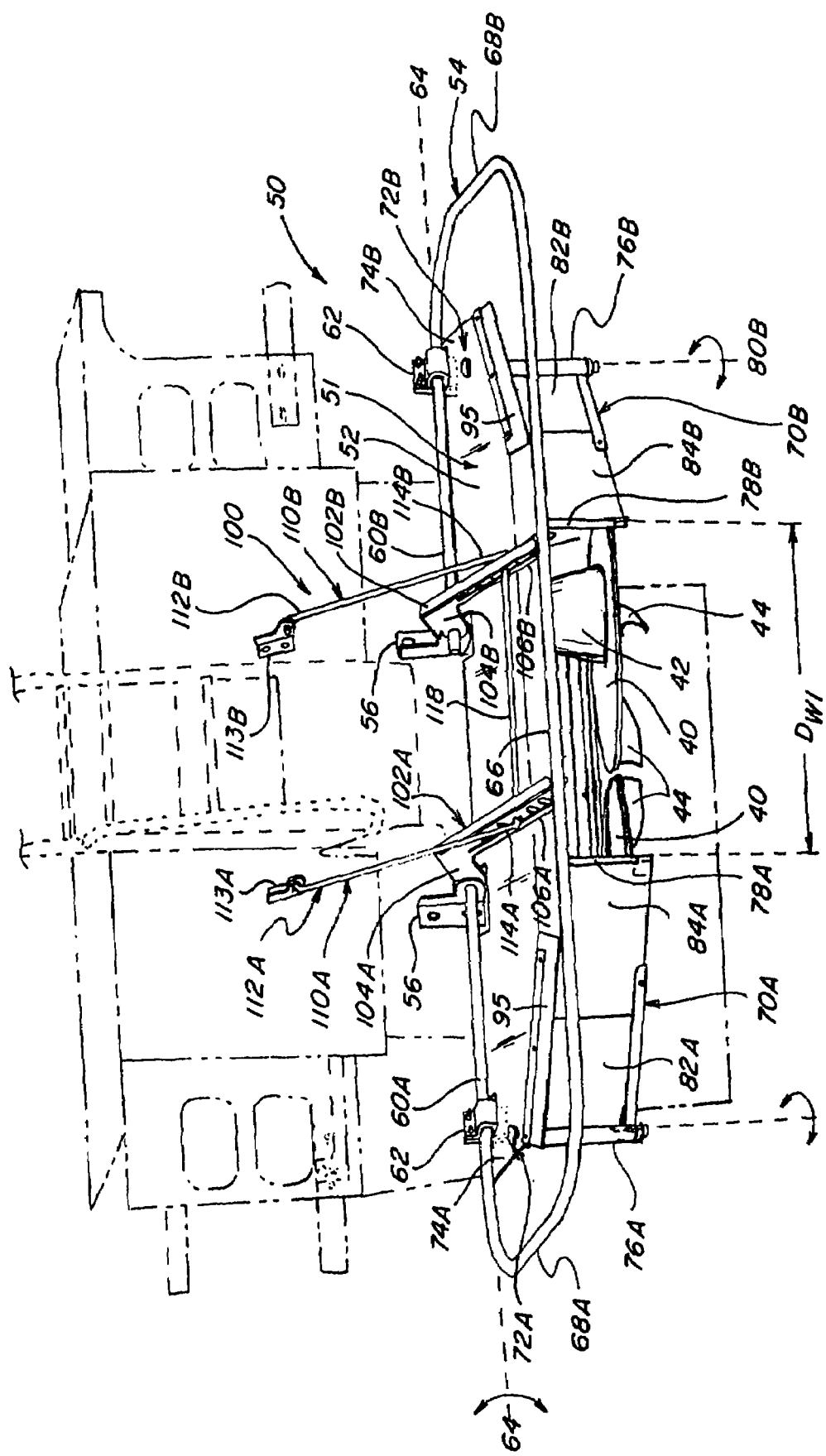
FIG. 6 is a rear, perspective view of an embodiment of a windrow forming construction according to the present invention in association with a spreader assembly, similar in some respects to FIG. 3, but depicting the spreader plates of the spreader assembly and the windrow forming construction as they might be configured for a windrowing operation.
Figure 7:
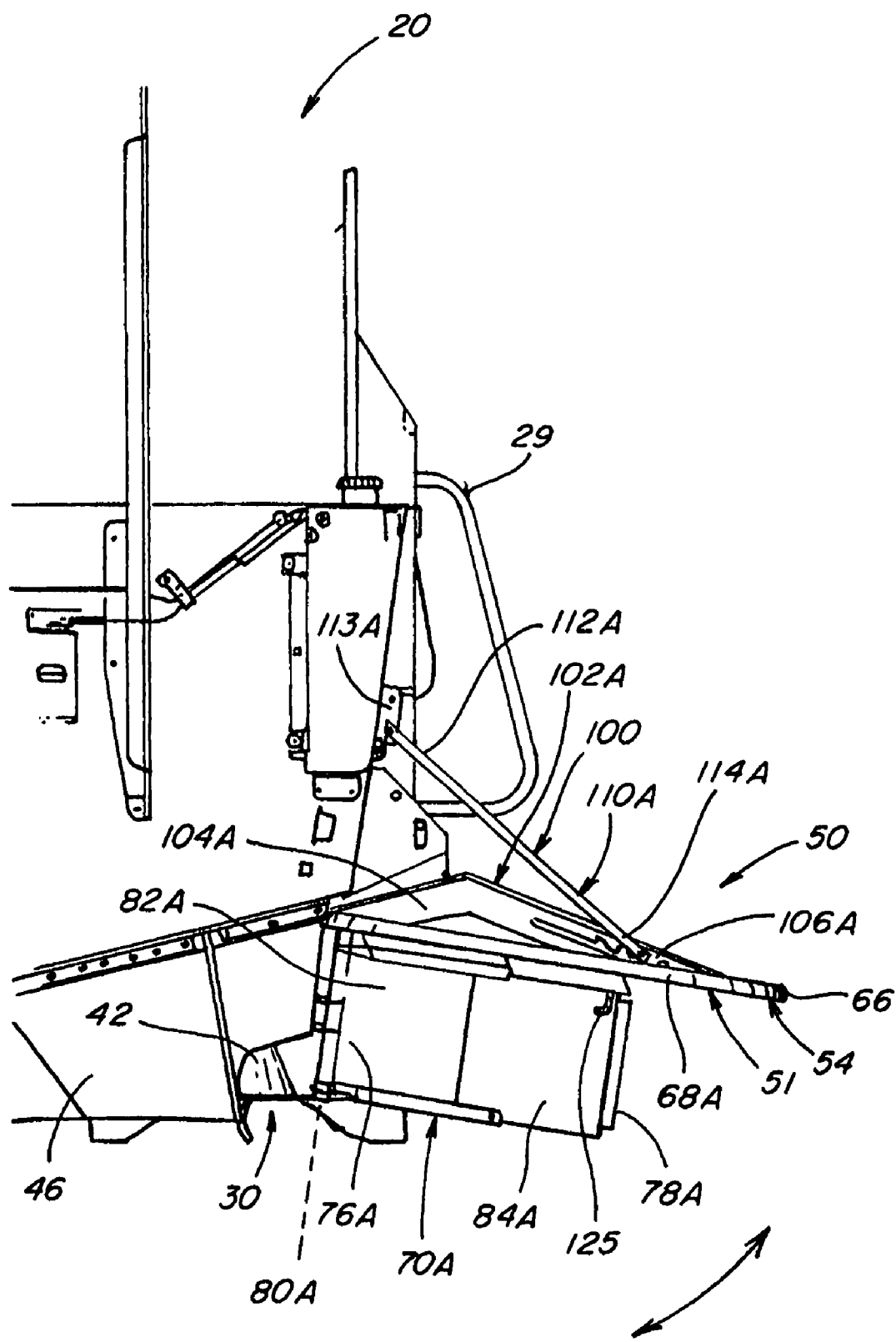
FIG. 7 is a left side view of a windrow forming construction similar to that depicted in FIG. 6, as installed at the rear of a combine and in association with a spreader assembly, with the side deflectors of the windrow forming construction in extended positions.
Figure 8:
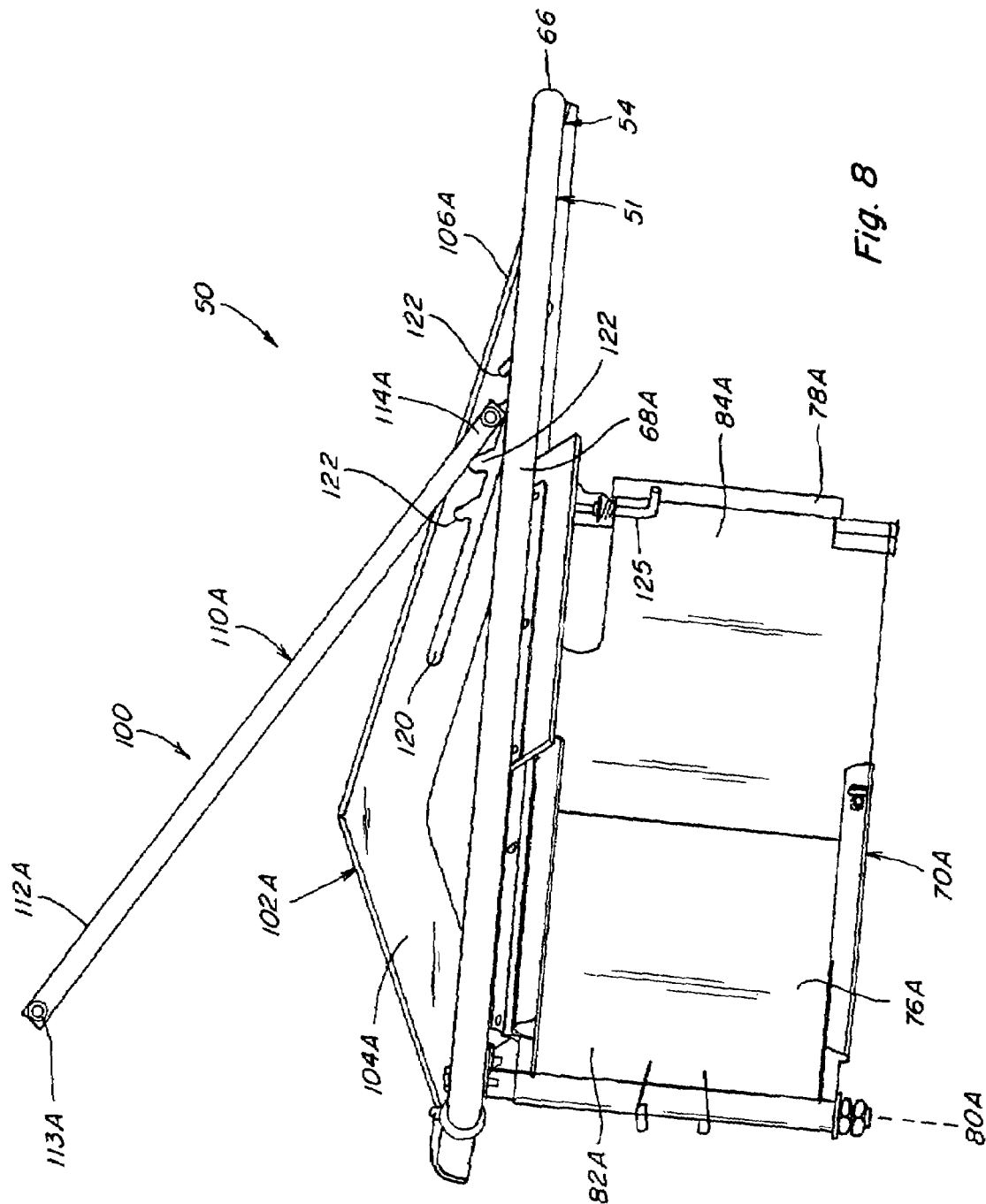
FIG. 8 is an enlarged left side view of the windrow forming construction of FIG. 7 better illustrating various of the elements and features of such construction.

FIGS. 6-8 correspond generally to FIGS. 3-5 but depict a manner in which the windrow forming construction 50 might be re-configured to establish a desired windrow width and the degree to which the crop residue is to be directed into the stubble remaining on the field during a windrowing operation. As shown in FIG. 6, the side deflectors 70A and 70B have been rotated about their respective deflector rotation axes 80A and 80B towards one another, past the flexible edge deflectors 95 which may be bent or flexed upwardly to permit the side deflectors to be moved below and past them, and the side deflectors have been extended to a desired extended length, as a consequence of which the spacing between the free ends 78A and 78B of side deflectors 70A and 70B is set to a distance $D_{W1}$, which is a desired windrow width. Main body 51 has been rotated about main body rotation axis 64 to a desired inclination of the main body 51 relative to the ground surface and locked in position by engaging the rear ends 114A and 114B of support arms 110A and 110B, at interconnection portion 118 (FIG. 6), in appropriate lock niches 122, as may be best observed from FIG. 8. Latching or locking mechanisms of any well known construction suitable for latching or locking the deflectors 70A and 70B in position, including constructions that employ latching or locking pins or bolts 125 with the deflectors 70A and 70B operable to be engaged by complementary elements associated with the upper deck 52, may be utilized to latch or lock the rotated and extended side deflectors 70A and 70B in desired positions for the windrowing operation. With the spreader plates 40 of the spreader assembly 30 then installed with the spreader bats 44 facing downwardly and the flat sides of the spreader plates facing upwardly, the spreader assembly 30 can then be operated to propel the crop residue being provided thereto rearwardly where the windrow forming construction 50 forms and directs the crop residue into a windrow on the field.

Depending upon the desires of the user, the side deflectors 70A and 70B can be extended more or less between the minimum retracted length and the maximum extended length and such deflectors 70A and 70B can be rotated more or less towards or away from one another about their respective deflector rotation axes 80A and 80B, the effect of which is to vary the spacing distance between the free ends 78A and 78B, which spacing distance may fall within the range between distances DSS and DW1 if the windrow forming construction is designed such that DSS is the maximum distance achievable between the free ends 78A and 78B and DW1 is the minimal achievable distance between the free ends 78A and 78B.

Figure 9:
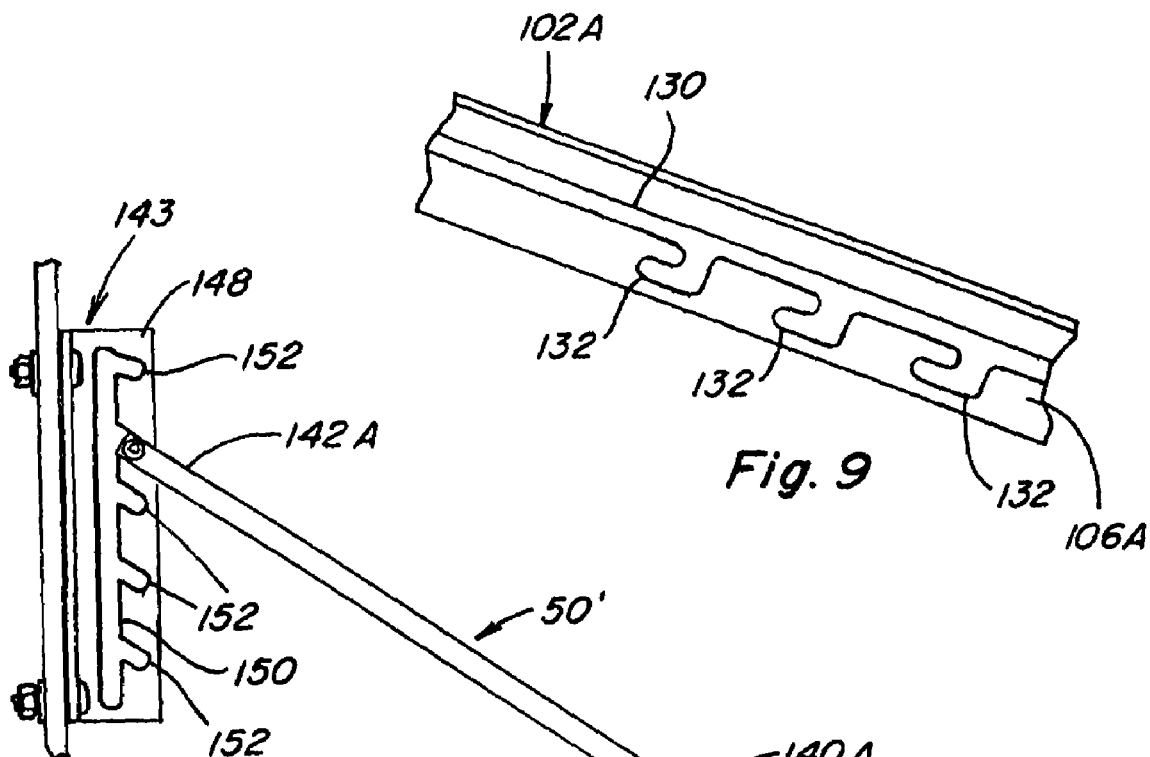
FIG. 9 is an enlarged left side view of a portion of a slot and lock system configuration depicting an alternative arrangement for locking the main body of the windrow forming construction at a desired inclination relative to the ground surface.

It will be understood by those skilled in the art that the present invention may take a variety of forms other than the particular embodiments described hereinabove and that various features and elements can be achieved through alternate means and constructions. For example, FIG. 9 depicts an alternate slot and lock system configuration that could be readily utilized in place of the slots 120 and lock niches 122 as depicted in FIGS. 2-8. In the configuration set forth in FIG. 9, a slot 130 may be disposed in the rear portion of a lift arm and may have associated therewith, instead of lock niches 122 along the top side of the slot, a plurality of locking positions 132 along the bottom side of the slot, such that, when the rear end of a support arm is moved into and engaged in a locking position 132, the main body will be supported at a desired inclination relative to the ground surface.

Figure 10:
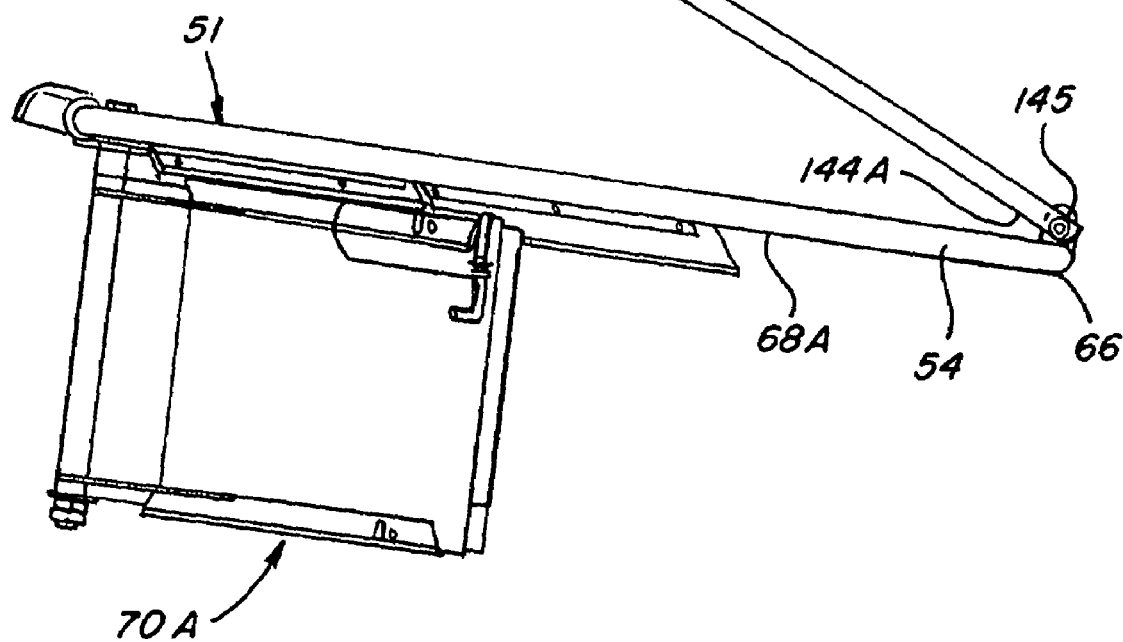
FIG. 10 is an enlarged left side view of a windrow forming construction similar in many respects to that of FIG. 8 but having an alternative positioning mechanism.

FIG. 10 depicts a left side view of an alternate positioning mechanism that could be employed and which does not require lift arms 102A and 102B. Instead, the alternate positioning mechanism 50' includes a pair of like position control arms, the left of which is designated as position control arm 140A. Since the positioning control arms and other associated elements are of like construction, the following discussion addressing the left position control arm and associated elements will generally also apply to the like right position control arm and its associated like elements. Position control arm 140A includes a first, forward end 142A connected to a slot and lock system 143 installed on the combine 20 or its associated equipment at an elevation above the frame mounting elevation and a second, rear end 144A coupled to rear portion 66 of outer base frame 54 to permit relative rotational movement of rear end 144A and rear portion 66 about a generally horizontal axis though connector 145. Slot and lock system 143 includes a bracket member 148 with a generally vertical slot 150 extending therealong and having a plurality of spaced lock niches 152 along the extent of the slot 150. By repositioning the forward end 142A of position control arm 140A from one lock niche 152 to another lock niche 152 along the slot 150, the elevation of the rear portion 66 of outer base frame 54 can be increased or decreased to change the inclination of main body 51 relative to the ground surface, as will be readily understood by those in the art, for the same purposes and to the same effect as has been previously addressed herein with respect to operation of the positioning mechanism 50.

Figure 11:
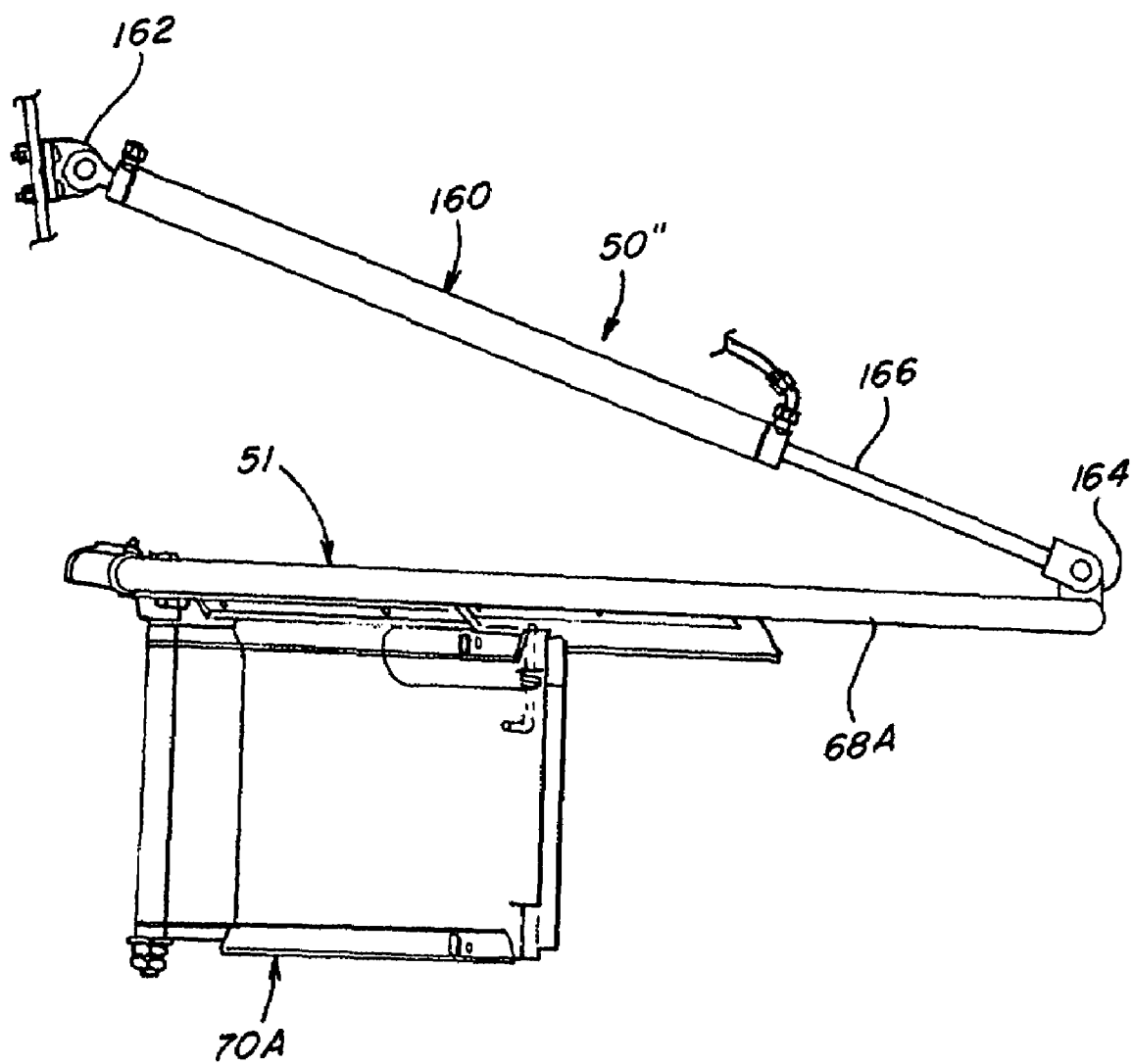
FIG. 11 is an enlarged left side view of a windrow forming construction similar in many respects to that of FIG. 8 but having a different alternative positioning mechanism.

While the positioning mechanisms that have been addressed hereinabove have utilized slot and lock systems of various configurations for varying the inclination of the main body 51 and supporting such main body 51 in a desired position, it will be recognized that the positioning mechanisms of the present invention may also take many forms that do not require or make use of slot and lock systems or like arrangements. By way of example, and not of limitation, FIG. 11 depicts one such other positioning mechanism 50" which utilizes an operator controlled hydraulic cylinder system 160, one end of which is connected to the combine 20 or associated equipment as at connector 162 and the other end of which is coupled to the outer frame base 54 as at connector 164 through piston rod 166, which hydraulic cylinder system is responsive to inputs from an operator to control the operation of piston rod 166 and, thus, the height of the rear portion 66 of outer base frame 54 and the inclination of main body 51 relative to the ground surface. Depending upon characteristics of the windrow forming construction, including its weight and the distribution of such weight, and the positioning of the hydraulic cylinder system, such hydraulic cylinder system may be designed to be either single-acting or double-acting, and could employ multiple cylinders or include load balancing elements.

For various reasons, including stability and balance purposes, many of the positioning mechanisms discussed hereinabove have utilized paired members for controlling the inclination of the main body 51 of the windrow forming construction and for supporting such construction in a desired position, but it should be appreciated and understood that, depending upon the characteristics of the combine and spreader assembly with which the windrow forming construction is employed, as well as the design characteristics of the windrow forming construction itself, more or fewer elements could be utilized to achieve the desired effect in controlling the inclination of the main body and supporting the windrow forming construction in desired positions without departing from the intended scope of the invention. In addition, many elements could be advantageously employed in the positioning mechanisms for adjusting, or controlling the adjustment of, the inclination of the main body relative to the ground surface, including various hydraulic, pneumatic, and electrical motors and control systems in addition to a host of manual adjustment and support systems that can be readily designed and utilized.

Furthermore, it should evident to those skilled in the art that many changes could be made to the main body and to the side deflectors, or variations thereof employed, without departing from the intended scope of the invention. By way of example and illustration, and not by way of limitation, the main body could be formed as a unitary casting or could be constructed to have a different formation and to have a different superstructure and connection points. Likewise, the side deflectors could employ different types of telescoping or extension arrangements and techniques, as well as a variety of other latching or locking arrangements and techniques for maintaining the deflectors in desired configurations and positions.

In light of all the foregoing, it should thus be apparent to those skilled in the art that there has been shown and described a windrow forming construction that permits a user of a harvesting combine to adjust or controllably vary to some extent the lateral width of a windrow and the degree to which the crop residue forming the windrow is blown or thrown into the remaining stubble on the field. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A windrow forming construction for an agricultural combine that has a rear residue output port for the discharge of crop residue therefrom and which can employ a spreader assembly positionable generally below and to the rear of the rear residue output port to receive and distribute crop residue, such a positioned spreader assembly defining a spreader assembly footprint at the rear of the combine, said windrow forming construction comprising a main body portion mountable to the rear of the combine for rotational movement about a generally horizontal axis of rotation generally laterally transverse to the combine defining a main body rotational axis, said main body portion positionable at a point in said rotational movement of said main body about said main body rotational axis to extend generally rearwardly from the combine over the top rear end of the footprint area for the spreader assembly to a rear portion beyond the rear end of such footprint area and to extend generally laterally across the expanse of the footprint area for the spreader assembly, said main body portion including opposed front side portions generally adjacent to the sides of the footprint area for the spreader assembly, a positioning mechanism operatively connectable to the combine and to said main body portion to support said main body at a plurality of rotational positions about said main body rotational axis, said positioning mechanism operable to vary the rotational positioning of said main body portion about said main body rotational axis and to maintain said main body portion at a desired rotational position, a pair of side deflectors disposed projecting generally downwardly towards the ground surface at said opposed front sides of said main body portion and extending generally along the sides of the footprint area of the spreader assembly, said side deflectors being connected at said opposed front sides of said main body portion to be pivotally rotatable about respective deflector rotation axes generally parallel to one another and transverse to said main body rotation axis, each of said side deflectors having a connected end portion and a free end portion, wherein said free end portion telescopically engaged with said connected end portion with the free end portion longitudinally slidable along said connected end portion to permit the lengths of said side deflectors to be adjustably varied from a minimum retracted length to a maximum extended length, said side deflectors being rotatable about their respective deflector rotation axes to vary the spacing between the free end portions of said side deflectors and to be rotatably positionable to desired positions, at least one rotational position of said main body portion about said main body rotational axis disposing said main body portion for use in forming a windrow, such rotational positioning defining a first windrowing position, said main body portion interacting with crop residue directed thereto when disposed in said first windrowing position to direct the crop residue towards the ground surface at a desired inclination corresponding generally to the inclination of said main body portion relative to the ground surface, wherein varying the rotational position of said side deflectors about their respective deflector rotation axes to a desired position while said main body portion is in said first windrowing position establishing a desired windrow width, whereby crop residue directed to said windrow forming construction during a harvesting operation by the combine will be formably directed onto the field behind the combine at a desired inclination corresponding to the inclination of said main body portion in said first windrowing position and In a desired width as determined by the spacing between said free ends of said side deflectors.

2. The windrow forming construction of claim 1 wherein said main body portion is rotatable to a plurality of different rotational positionings about said main body rotational axis disposing said main body portion for use in forming a windrow, such different rotational positionings defining a plurality of different windrowing positions, said main body portion interacting with crop residue directed thereto when disposed in said different windrowing positions to direct the crop residue towards the ground surface at different desired inclinations corresponding generally to the different inclinations of said main body portion relative to the ground surface in said different windrowing positions, whereby crop residue directed to said windrow forming construction during a harvesting operation by the combine when said main body is positioned in a given one of said different windrowing positions will be formably directed onto the field behind the combine at an inclination corresponding to the inclination of said main body portion in said given one of said windrowing positions and in a desired width as determined by the spacing between said free ends of said side deflectors.

3. The windrow forming construction of claim 1 wherein said main body portion is rotatable to a rotational positioning about said main body rotational axis disposing said main body portion significantly vertically for servicing.

4. The windrow forming construction of claim 1 wherein said positioning mechanism includes a lift assembly, said lift assembly operable by a user to lift or lower the rear portion of said main body and to thereby effect a rotation of said main body portion about said main body rotation axis.

5. The windrow forming construction of claim 4 wherein said lift assembly includes
    a pair of lift arms connected to said main body portion to extend generally thereacross from front to rear thereof, said lift arms each including a slot and lock system therein extending therealong, said slot and lock system including a slot and a plurality of locking areas along said slot,
    a pair of support arms having front ends operatively connectable to the combine above the height of said main body rotation axis and rear end portions engagable with said slot and lock system, said rear end portions movable along said slots and positionable within said locking areas,
        whereby movement of said rear end portions of said support arms along said slots effects, rotation of said main body portion about said main body rotation axis and positioning of said rear end portions of said support arms in corresponding locking areas along said slots latches said main body portion at a given rotational positioning about said main body rotation axis.

6. The windrow forming construction of claim 5 wherein said lift arms extend generally parallel to one another and said rear portions of said lift arms include a interconnection portion extending generally transversely between said lift arms.

7. The windrow forming construction of claim 5 wherein said locking areas include lock niches disposed along the topsides of said slots sized and configured to accommodate said rear portions of said support arms therein.

8. The windrow forming construction of claim 5 wherein said locking areas include locking positions disposed along the bottom sides of said slots sized and configured to accommodate said rear portions of said support arms therein.

9. The windrow forming construction of claim 4 wherein said lift assembly includes
    a slot and lock system operatively mountable to the combine at a height above the height of said main body rotation axis, said slot and lock system including generally vertically extending slots and a plurality of locking areas along said slots,
    a pair of support arms having rear ends operatively connected to said main body portion and front end portions engagable with said slot and lock system, said front end portions movable along said slot and positionable within said locking areas,
        whereby movement of said front end portions of said support arms along said slots effects a rotation of said main body portion about said main body rotation axis and positioning of said front end portions of said support arms in corresponding locking areas along said slots latches said main body portion at a given rotational positioning about said main body rotation axis.

10. The windrow forming construction of claim 9 wherein said slot and lock system includes a pair of similar bracket members operatively connectable to the combine at spaced lateral positions and each including therein said slots and said locking areas.

11. The windrow forming construction of claim 4 wherein said lift assembly includes an arm member operatively connected at one end to the combine and at the other end to said main body portion adjacent to said rear portion thereof, the length of said arm member being adjustable.

12. The windrow forming construction of claim 11 wherein said arm member is telescopically adjustable.

13. The windrow forming construction of claim 12 wherein said arm member includes a hydraulically controllable cylinder system.

14. The windrow forming construction of claim 11 wherein said lift assembly includes a plurality of similar arm members.

15. The windrow forming construction of claim 4 wherein said lift assembly is remotely operable by a user.

16. The windrow forming construction of claim 1 wherein said side deflectors include first end portions associated with said connected ends thereof and second end portions associated with said free ends thereof, said first and second end portions being engaged with one another to be slidable relative to one another to vary the length of said deflectors between a minimum retracted length and a maximum extended length.

17. The windrow forming construction of claim 1 wherein said side deflectors and said main body portion include mechanisms having portions complementarily engagable with one another to latch said defectors in place at desired rotational positionings of said deflectors about their deflector rotation axes.

18. The windrow forming construction of claim 1 wherein said main body portion includes
an outer base frame having a front portion connectable to the combine for journalled movement at the height of said main body rotation axis, a rear portion extending to beyond the rear of the footprint area of the spreader assembly of the combine, and side portions extending beyond the sides of the footprint area of the spreader assembly of the combine,
an upper deck disposed within said outer base frame extending to cover the substantial entirety of the footprint area of the spreader assembly of the combine.

19. The windrow forming construction of claim 18 wherein said outer frame base is of a generally rectangular racetrack configuration.

20. The windrow forming construction of claim 19 wherein said upper deck is of a generally trapezoidal shape, having a wider portion generally adjacent said front portion of said outer base frame, a narrower portion generally along the rear portion of said outer base frame, and side portions extending between said wider and narrower portions, said side portions including angled areas having edge deflectors thereat for deflecting crop residue downwardly.

21. The windrow forming construction of claim 20 wherein said side deflectors are rotatable towards one another about their respective deflector rotation axes to move said side deflectors past said edge deflectors and wherein said side deflectors and said upper deck include mechanisms having portions complementarily engagable with one another to latch said deflectors in place at such rotational positionings of said deflectors about their deflector rotation axes.

22. A method of forming a windrow having a desired width and having the crop residue thereof directed onto the field at a desired inclination behind a combine, which combine may have associated therewith a spreader assembly positionable generally below and to the rear of the rear residue output port of the combine to receive and distribute the crop residue, such a positioned spreader assembly defining a spreader assembly footprint at the rear of the combine, the method comprising
providing a windrow forming construction including
a main body portion mounted to the rear of the combine for rotational movement about a generally horizontal axis of rotation generally laterally transverse to the combine defining a main body rotational axis, said main body portion positionable at a point in said rotational movement of said main body about said main body rotational axis to extend generally rearwardly from the combine over the top rear end of the footprint area for the spreader assembly to a rear portion beyond the rear end of such footprint area and to extend generally laterally across the expanse of the footprint area for the spreader assembly, said main body portion including opposed front side portions generally adjacent to the sides of the footprint area for the spreader assembly,
a positioning mechanism operatively connected to the combine and to said main body portion to support said main body at a plurality of rotational positions about said main body rotational axis, said positioning mechanism operable to vary the rotational positioning of said main body portion about said main body rotational axis and to maintain said main body portion at a desired rotational position,
a pair of side deflectors disposed projecting generally downwardly towards the ground surface at said opposed front sides of said main body portion and extending generally along the sides of the footprint area of the spreader assembly, said side deflectors being connected at said opposed front sides of said main body portion to be pivotally rotatable about respective deflector rotation axes generally parallel to one another and transverse to said main body rotation axis, each of said side deflectors having a connected end portion and a free end portion, wherein said free end portion telescopically engaged with said connected end portion with the free end portion longitudinally slidable along said connected end portion to permit the lengths of said side deflectors to be adjustably varied from a minimum retracted length to a maximum extended length, said side deflectors being rotatable about their respective deflector rotation axes to vary the spacing between the free end portions of said side deflectors and to be rotatably positioned to desired positions,
at least one rotational positioning of said main body portion about said main body rotational axis disposing said main body portion for use in forming a windrow, such rotational positioning defining a first windrowing position, said main body portion interacting with crop residue directed thereto when disposed in said first windrowing position to direct the crop residue towards the ground surface at a desired inclination corresponding generally to the inclination of said main body portion relative to the ground surface,
the rotational positioning of said side deflectors about their respective deflector rotation axes to a desired position while said main body portion is in said first windrowing position establishing a desired windrow width,
rotating said side deflectors about their respective deflector rotation axes and positioning said side deflectors to have a desired spacing between said free ends of said side deflectors,
extending telescopically said free end portion of each said side deflectors to adjust the length of said side deflectors from a minimum retracted length to a maximum extended length, positioning said main body to said first windrowing position, and operating the combine to direct crop residue towards said windrow forming construction, whereby crop residue directed to said windrow forming construction during a harvesting operation by the combine will be formably directed onto the field behind the combine at a desired inclination corresponding to the inclination of said main body portion in said first windrowing position and in a desired width as determined by the spacing between said free ends of said side deflectors.

23. A method of selectively engaging in swath spreading or windrowing operations to distribute crop residue behind a combine, which combine may have associated therewith a spreader assembly positionable generally below and to the rear of the rear residue output port of the combine to receive and distribute the crop residue, such a positioned spreader assembly defining a spreader assembly footprint at the rear of the combine, wherein the windrow laid during a windrowing operation has a desired width and the crop residue thereof is directed onto the field at a desired inclination behind a combine, the method comprising providing a windrow forming construction including a main body portion mounted to the rear of the combine for rotational movement about a generally horizontal axis of rotation generally laterally transverse to the combine defining a main body rotational axis, said main body portion positionable at a point in said rotational movement of said main body about said main body rotational axis to extend generally rearwardly from the combine over the top rear end of the footprint area for the spreader assembly to a rear portion beyond the rear end of such footprint area and to extend generally laterally across the expanse of the footprint area for the spreader assembly, said main body portion including opposed front side portions generally adjacent to the sides of the footprint area for the spreader assembly, a positioning mechanism operatively connected to the combine and to said main body portion to support said main body at a plurality of rotational positions about said main body rotational axis, said positioning mechanism operable to vary the rotational positioning of said main body portion about said main body rotational axis and to maintain said main body portion at a desired rotational position, a pair of side deflectors disposed projecting generally downwardly towards the ground surface at said opposed front sides of said main body portion and extending generally along the sides of the footprint area of the spreader assembly, said side deflectors being connected at said opposed front sides of said main body portion to be pivotally rotatable about respective deflector rotation axes generally parallel to one another and transverse to said main body rotation axis, each of said side deflectors having a connected end portion and a free end portion, wherein said free end portion telescopically engaged with said connected end portion with the free end portion longitudinally slidable said connected end portion to permit the lengths of said side deflectors to be adjustably varied from a minimum retracted length to a maximum extended length, said side deflectors being rotatable about their respective deflector rotation axes to vary the spacing between the free end portions of said side deflectors and to be rotatably positioned to desired positions, at least one rotational positioning of said main body portion about said main body rotational axis disposing said main body portion for use in distributing the crop residue, such rotational positioning defining a use position, said main body portion interacting with crop residue directed thereto when disposed in said use position to direct the crop residue towards the ground surface at a desired inclination corresponding generally to the inclination of said main body portion relative to the ground surface, rotating said side deflectors about their respective deflector rotation axes and positioning said side deflectors to have a desired spacing between said free ends of said side deflectors to selectively set such desired spacing for either swath spreading or windrowing, extending telescopically said free end portion of each said side deflectors to adjust the length of said side deflectors from a minimum retracted length to a maximum extended length, positioning said main body to said use position, and operating the combine to direct crop residue towards said windrow forming construction, whereby crop residue directed to said windrow forming construction during a harvesting operation by the combine will be directed onto the field behind the combine at a desired inclination corresponding to the inclination of said main body portion in said use position and selectively distributed either as a swath or as a windrow of a desired width as determined by the spacing between said free ends of said side deflectors.

* * * * *